US012657433B2

(12) United States Patent
Li et al.

(10) Patent No.: US 12,657,433 B2
(45) Date of Patent: Jun. 16, 2026

(54) RETRIEVAL METHOD FOR SURFACE OZONE BASED ON SURFACE ULTRAVIOLET RADIATION IRRADIANCE

(71) Applicant: Wuhan University, Wuhan (CN)

(72) Inventors: Siwei Li, Wuhan (CN); Ge Song, Wuhan (CN); Jie Yang, Wuhan (CN); Maolin Zhang, Wuhan (CN)

(73) Assignee: WUHAN UNIVERSITY, Hubei (CN)

( * ) Notice: Subject to any disclaimer, the term of this patent is extended or adjusted under 35 U.S.C. 154(b) by 904 days.

(21) Appl. No.: 17/973,577

(22) Filed: Oct. 26, 2022

(65) Prior Publication Data

US 2023/0131036 A1 Apr. 27, 2023

(30) Foreign Application Priority Data

Oct. 26, 2021 (CN) .......................... 202111245783.6

(51) Int. Cl.
*G06N 3/045* (2023.01)
*G06N 3/08* (2023.01)
*G06N 20/20* (2019.01)

(52) U.S. Cl.
CPC .............. *G06N 3/045* (2023.01); *G06N 3/08* (2013.01); *G06N 20/20* (2019.01); *Y02A 50/20* (2018.01)

(58) Field of Classification Search
CPC .......... G06N 3/045; G06N 3/08; G06N 20/20; G06N 5/01; G06N 20/10; G06N 33/0039; Y02A 50/20; Y02A 5/20
See application file for complete search history.

(56) References Cited

U.S. PATENT DOCUMENTS

| | | | | |
|---|---|---|---|---|
| 10,962,473 B1 * | 3/2021 | O'Hara | ................. | G01N 21/35 |
| 11,328,177 B2 * | 5/2022 | Jones | .................... | G06V 10/87 |

(Continued)

FOREIGN PATENT DOCUMENTS

| | | | | | |
|---|---|---|---|---|---|
| CN | 111310386 A | * | 6/2020 | ........ | G01N 33/0039 |
| CN | 111339665 A | * | 6/2020 | ............. | G06N 3/045 |
| CN | 113189014 A | * | 7/2021 | ............. | G06N 3/045 |

OTHER PUBLICATIONS

Zang, Zhou, et al. "Tree-based ensemble deep learning model for spatiotemporal surface ozone (O3) prediction and interpretation." International Journal of Applied Earth Observation and Geoinformation 103 (2021): 102516. (Year: 2021).*

(Continued)

*Primary Examiner* — Andrew L Tank
(74) *Attorney, Agent, or Firm* — JCIP GLOBAL INC.

(57) ABSTRACT

A retrieval method for surface ozone based on surface ultraviolet radiation irradiance includes: establishing a deep learning model; establishing a statistical relationship between input variables including surface UV irradiance, column ozone, elevation of a geolocation, year/month/date, latitude and longitude, and surface ozone concentrations at monitoring sites; matching a site-monitored surface ozone concentration with the surface UV irradiance and column ozone; training the deep learning model; estimating surface ozone concentrations in regions with available satellite observations based on the trained deep learning model; and inputting surface UV irradiance, column ozone, elevation of a geolocation, year/month/date, latitude and longitude into the trained deep learning model to estimate surface ozone concentration; evaluating an air quality based on the surface ozone concentration of the geolocation.

6 Claims, 7 Drawing Sheets

(56) References Cited

U.S. PATENT DOCUMENTS

| | | | | |
|---|---|---|---|---|
| 2011/0313958 A1* | 12/2011 | Roverso | ................. | G01W 1/00 |
| | | | | 706/12 |
| 2017/0090068 A1* | 3/2017 | Xiang | .................... | G01V 20/00 |
| 2019/0303795 A1* | 10/2019 | Khiari | ...................... | G06N 5/01 |
| 2021/0256542 A1* | 8/2021 | McDaniel | ............ | A61B 5/4017 |
| 2021/0373009 A1* | 12/2021 | Neogi | ...................... | C12Q 1/70 |

OTHER PUBLICATIONS

Yang, Xiaoting, Meng Zhang, and Bo Zhang. "A Generic Model to Estimate Ozone Concentration From Landsat 8 Satellite Data Based on Machine Learning Technique." IEEE Journal of Selected Topics in Applied Earth Observations and Remote Sensing 14 (2021): 7938-7947. (Year: 2021).*

Lu, Hua, et al. "Adjusting prediction of ozone concentration based on CMAQ model and machine learning methods in Sichuan-Chongqing region, China." Atmospheric Pollution Research 12.6 (2021): 101066. (Year: 2021).*

Devi, P. Durga, and M. Chandrakala. "Air Quality Prediction using Ensemble Machine Learning Algorithm.", International Journal of Engineering Research & Technology (IJERT), ICACT—2021 vol. 9, Issue 8: 10-12 (Year: 2021).*

Jebamalar, J. Angelin, and T. Kamalakannan. "Enhanced stacking ensemble model in predictive analytics of environmental sensor data." 2021 International Conference on Artificial Intelligence and Smart Systems (ICAIS). IEEE, 2021. (Year: 2021).*

Zheng, Hong, Yunhui Cheng, and Haibin Li. "Investigation of model ensemble for fine-grained air quality prediction." China Communications 17.7 (2020): 207-223 (Year: 2020).*

Yu, Haomin, et al. "A deep calibration method for low-cost air monitoring sensors with multilevel sequence modeling." IEEE Transactions on Instrumentation and Measurement 69.9 (2020): 7167-7179. (Year: 2020).*

Liang, Yun-Chia, et al. "Machine learning-based prediction of air quality." applied sciences 10.24 (2020): 9151. (Year: 2020).*

Requia, Weeberb J., et al. "An ensemble learning approach for estimating high spatiotemporal resolution of ground-level ozone in the contiguous United States." Environmental science & technology 54.18 (2020): 11037-11047, including Supporting Information S1-S44 (Year: 2020).*

Liang, Chen, et al. "An improved global land anthropogenic aerosol product based on satellite retrievals from 2008 to 2016." IEEE Geoscience and Remote Sensing Letters 18.6 (2020): 944-948. (Year: 2020).*

Choi, Hyunyoung, et al. "Monitoring ground-level SO2 concentrations based on a stacking ensemble approach using satellite data and numerical models." Korean Journal of Remote Sensing, Vo.36, No. 5-3, 2020, pp. 1053-1066 (Year: 2020).*

Sankar Ganesh, S., Pachaiyappan Arulmozhivarman, and Rao Tatavarti. "Forecasting air quality index using an ensemble of artificial neural networks and regression models." Journal of Intelligent Systems 28.5 (2019): 893-903. (Year: 2019).*

Zhai, Binxu, and Jianguo Chen. "Development of a stacked ensemble model for forecasting and analyzing daily average PM2. 5 concentrations in Beijing, China." Science of the Total Environment 635 (2018): 644-658. (Year: 2018).*

Xiao, Qingyang, et al. "An ensemble machine-learning model to predict historical PM2. 5 concentrations in China from satellite data." Environmental science & technology 52.22 (2018): 13260-13269. (Year: 2018).*

Li, Lianfa, et al. "An ensemble spatiotemporal model for predicting PM2. 5 concentrations." International journal of environmental research and public health 14.5 (2017): 549. (Year: 2017).*

Sellitto, Pasquale, et al. "Tropospheric ozone column retrieval from ESA-Envisat SCIAMACHY nadir UV/VIS radiance measurements by means of a neural network algorithm." IEEE transactions on geoscience and remote sensing 50.3 (2011): 998-1011. (Year: 2011).*

* cited by examiner

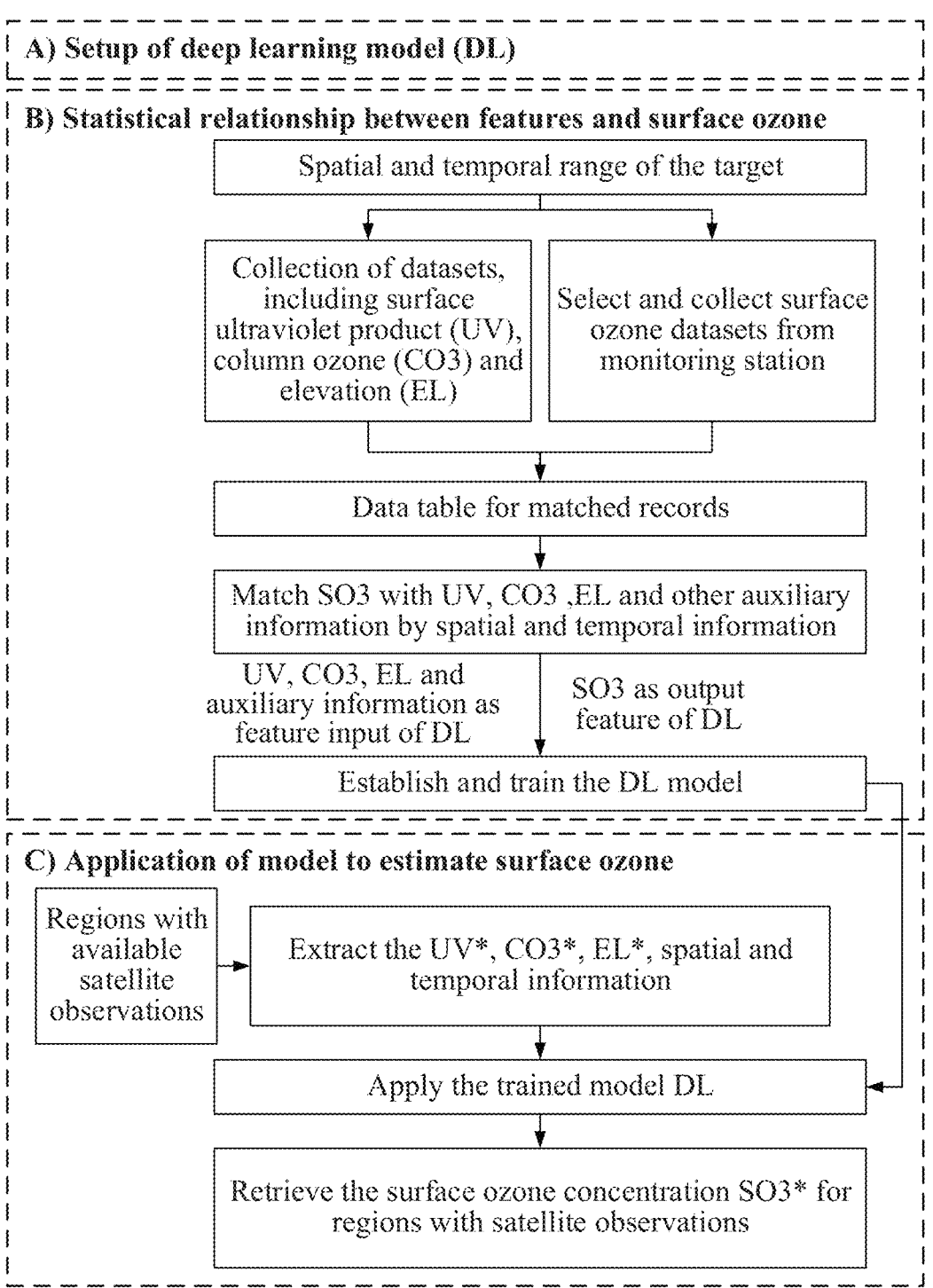

A) Setup of deep learning model (DL)

B) Statistical relationship between features and surface ozone

Spatial and temporal range of the target

Collection of datasets, including surface ultraviolet product (UV), column ozone (CO3) and elevation (EL)

Select and collect surface ozone datasets from monitoring station

Data table for matched records

Match SO3 with UV, CO3 ,EL and other auxiliary information by spatial and temporal information UV, CO3, EL and auxiliary information as feature input of DL SO3 as output feature of DL Establish and train the DL model

C) Application of model to estimate surface ozone

Regions with available satellite observations

Extract the UV*, CO3*, EL*, spatial and temporal information

Apply the trained model DL

Retrieve the surface ozone concentration SO3* for regions with satellite observations

FIG. 1

RETRIEVAL METHOD FOR SURFACE OZONE BASED ON SURFACE ULTRAVIOLET RADIATION IRRADIANCE

CROSS-REFERENCE TO RELATED APPLICATION

This application claims the priority benefit of China application serial no. 202111245783.6, filed on Oct. 26, 2021. The entirety of the above-mentioned patent application is hereby incorporated by reference herein and made a part of this specification.

BACKGROUND

The disclosure relates to for the field of passive satellite remote sensing of surface ozone and, and more particularly, to a retrieval method for surface ozone based on surface ultraviolet radiation irradiance.

Surface ozone is one of the major pollutants to the air quality deterioration, which has adverse effect on human health and ecology. The sparse distribution of ground monitoring sites for air quality cannot meet the wide-coverage requirement for surface ozone monitoring. Hence, satellite remote sensing is crucial for enhanced surface ozone monitoring due to its wide coverage. The current remote sensing method for surface ozone has limitation of low accuracy. It is critical to develop highly accurate method to achieve satellite remote sensing of surface ozone, which is also an important application of enhanced passive remote sensing technology.

Current methods to monitor the surface ozone by satellite remote sensing has largely been constrained by a missing understanding of ozone formation mechanism. The mainstream strategy of retrieving the surface ozone is based on establishing the statistical relationship between the surface ozone and the ozone column, which is generally regarded as the main indicator of surface ozone. However, due to the low correlation between the ozone column and the surface ozone by virtue of ozone vertical distribution, it is difficult to establish a precise relationship between the surface ozone and observation information from remote sensing. Thus, current methods cannot achieve a highly accurate retrieval of surface ozone. The frontier researches in the field of chemistry have clearly indicated that, the effect of ozone photochemical formation is fundamental to the surface ozone level. Therefore, how to effectively integrate the ozone photochemical processes into the retrieval of surface ozone is highly important to obtain its accurate retrieval.

On the other hand, numerous factors show correlation with surface ozone concentration, comprising the photochemical factors such as surface ultraviolet irradiance, transport factors such as meteorological conditions, sink factors such as the relative humidity. These factors present complex relationship with surface ozone concentration, and the simple and empirical equations are not possible to clarify the relationship between the surface ozone and relative factors. Hence, enhanced statistical model is required to capture the relationship between the surface ozone and its relative factors. In recent years, machine learning models have been utilized as common tools for retrievals in the field of remote sensing, and the data complexity has been successfully resolved by the machine learning models. Over the past few years, machine-learning-based statistical models have been widely reported to capture the characteristics of surface ozone and its relative factors, including Random Forest (RF), Convolutional Neural Network (CNN), Residual Neural Network (RNN), Long Short-term Memory (LSTM). However, due to the complex non-linear statistical relationship for the intrinsic surface ozone, current machine learning models have difficulty capturing the complex relationship. Therefore, a superior machine learning is essential for the purpose of capturing the data characteristics of surface ozone.

In summary, the state-of-the-art retrieval for surface ozone, which is based on ozone column and meteorological information, is insufficient to characterize the surface ozone concentration. To fulfil the highly accurate retrieval of surface ozone, integration of photochemical mechanisms into the retrieval processes and enhanced deep learning models are important. This method can provide useful tools to monitor the surface ozone pollution situations and cultivate the development and further applications of passive satellite remote sensing technologies.

SUMMARY

To achieve the purpose of retrieval of surface ozone concentration by satellite remote sensing with high accuracy, this disclosure uses the Stacking technique, which is an ensemble machine learning algorithm that learns how to best combine the predictions from multiple well-performing machine learning models. The machine learning models utilized the satellite remotely sensed surface ultraviolet irradiance as the main indicator of surface ozone, and used the Stacking technique to establish the statistical relationship. This method can ensure the relationship between the surface ozone and relative factors to be accurately captured, as well as the full coverage of the retrieved surface ozone by satellite passive remote sensing. Hence, this method is the key to the accurate and spatially continuous retrieval of surface ozone.

The disclosure integrates atmospheric photochemistry mechanisms into the retrieval of surface ozone. This disclosure incorporates the catalytic cycle of photochemical formation of surface ozone, as shown in reactions (1)-(3). The rate-determining step of the photochemical ozone formation is the equation (1), in which the surface ultraviolet irradiance provides the activation energy of the reaction. As the decisive factor of ozone photochemical formation, only surface ultraviolet with wavelength lower than 420 nm would contribute to the equation (1). The optimal wavelength of surface ultraviolet is determined by evaluations of the retrieval performance by virtue of incorporating different wavelength ranges into the surface ozone retrieval. As a result, the optimal wavelength of surface ultraviolet irradiance as an input feature of the surface ozone retrieval is 380 nm, which indicates the surface ozone levels as well as excluding the interference by stratospheric ozone during the retrieval. This selection enables a strong relationship between the surface ultraviolet and surface ozone. In this disclosure, the above photochemical mechanisms are incorporated into the retrieval method, which provides support for accurately capturing the intrinsic characteristics of surface ozone and is the key to fulfil the highly accurate retrieval of surface ozone.

$$NO_2 + h\nu \, (\lambda < 420 \text{ nm}) \rightarrow NO + O(^3P) \tag{1}$$

$$O(^3P) + O_2 \xrightarrow{M} O_3 \tag{2}$$

$$O_3 + NO \rightarrow NO_2 + O_2 \tag{3}$$

In this disclosure, the surface ozone retrieval is based on satellite remote sensing, where OMI sensor onboard Aura satellite provides the data source. The Aura Ozone Monitoring Instrument (OMI) daily L3 products, OMUVBd and OMNO2d are used to provide surface UV irradiance and tropospheric NO2 column, respectively. The OMI sensor onboard Aura satellite measures spectral region of 264-504 nm with resolution of 0.42-0.63 nm. The spatial resolution is 13×24 km2 and has daily global coverage with bypass time at local time around 2 μm. The OMI products were obtained from NASA's Goddard Earth Sciences Data and Information Services Center (GES DISC) website (https://daac.gsfc.nasa.gov/). The regions with retrieved data in OMI-UV and OMI-NO2 product overlap with each other due to the same sensor, which reduces the systematic error caused by the divergence from different sensors.

Stacking technique, as an ensemble learner, can integrate the advantages of multiple regressors to enhance the machine learning model performance. The Stacking ensemble learner have two layers. The first layer ensembles six machine learning models, comprising Random Forest, XGBoost, LightGBM, Catboost, SVM and Residual Compiler. The ensemble learner condenses the advantageous features from the machine learning models and provides highly compact estimations. These estimations, as the input features of the second layer, provide support for the highly accurate prediction in the second layer. Among the machine learning models, the Random Forest model can generate an internal unbiased estimate of the generalization error; the XGBoost model can effectively prevent overfitting, thereby improving the generalization ability of the model; Light-GBM has fast processing speed, uses less memory, and has high potential for industrial applications; Catboost model reduces the need for hyperparameter tuning, and the model is highly versatile; the SVM model can capture the key samples that are critical to the task, and then efficiently deal with nonlinear problems; Residual Compiler is designed to alleviate the gradient dispersion problem in neural networks to obtain results with high precision.

The design of the residual network structure in this disclosure introduces an improved deep coding and decoding structure as the basis of the internal topology of the network. It uses the rectified linear unit (ReLU) activation function, and uses batch normalization (BN) processing after each hidden layer of the network. This operation aims to counteract the internal covariate shift between two adjacent hidden layers. At the same time, a dropout layer is added after the hidden unit of the encoding layer to achieve regularization and reduce the generalization error. The residual network uses bypasses or shortcuts to skip some hidden layers to achieve residual connections, so as to avoid the disappearance of gradients. Its optimal network structure can be tuned by grid search. The second layer of the Stacking ensemble learner uses a simple Lasso model to synthesize the results in the first layer to obtain the final estimations. The Lasso model has the advantage of simple model structure and avoids the potential overfitting. By combinations of these models, the Stacking ensemble learner therefore performs well in terms of model accuracy, generalization, application efficiency, and robustness. The diagram of the final machine learning model is shown in the description part. The machine learning model in this disclosure adopts the above-mentioned complex structure, which can provide support for accurately capturing the data characteristics of surface ozone and its related factors. The model structure is the key to obtaining accurate surface ozone concentration in this disclosure.

To achieve the retrieval of surface ozone with high accuracy, the input feature selection is conducted based on relative researches. The selection of the input features into the surface ozone retrieval model comprises: (1) the surface ultraviolet irradiance at 380 nm is selected to highlight the photochemical mechanism and its effect on the surface ozone concentration; (2) the ozone column is comprised as the input features to address the vertical distribution of ozone and its effect on the surface ozone; (3) spatial information (i.e. latitude and longitude) is incorporated to demonstrate the spatial characteristics of surface ozone, where ozone concentration is likely to accumulate at emission sources and their neighborhoods; (4) temporal information of surface ozone (i.e. year, month and day) is involved into the model due to strong temporal characteristics of surface ozone, where its level is higher in summer and lower in winter, and the neighboring days are likely to show similar trends; (5) elevation data is used as input to augment the spatial information of surface ozone.

To achieve the above goals, three steps are processed in this disclosure: A) setup of deep learning model; B) establishment of statistical relationship between the input features and surface ozone concentrations at monitoring sites; C) application of the trained machine learning model to estimate the spatially continuous surface ozone by satellite remote sensing. The setup of deep learning model comprises the construction of Stacking ensemble learner and its Residual Compiler component. The establishment of statistical relationship between the input features and surface ozone involves the spatial and temporal matching of the on-site surface ozone data with satellite observations, followed by the training of the deep learning model. The application of the model is to provide fast estimations on surface ozone concentrations in regions with available satellite observations based on the trained deep learning model in the previous step.

A) Setup of Deep Learning Model 1. building a deep learning model with Python 3.8; wherein the deep learning model comprises a plurality of modules such as Tensorflow, Keras, mlxtend, catboost, xgboost, lightgbm and sklearn;

2. selecting one ensemble learner structure as the basis of the deep learning model to increase the model generalization; in the disclosure, Stacking ensemble learner is selected due to its ability to combine the advantages of multiple machine learning models;

3. applying six models in the first layer of the Stacking ensemble learner, comprising Random Forest, XGBoost, LightGBM, CatBoost, SVM and Residual Compiler; and applying Lasso as a generalized linear regression model in the second layer of the Stacking ensemble learner;

4. configuring the parameters of the Residual Compiler as follows: an encoder part comprises four hidden layers, and the number of nodes in each layer is (256, 128, 64, 32); a transition layer comprises two hidden layers, and the number of nodes in each layer is (16, 16); and a decoder part comprises four hidden layers, and the number of nodes in each layer is (32, 64, 128, 256); adding the output of each hidden layer in the encoder to the hidden layer of the same number of nodes in the decoder to form a residual block; and adding a fully connected layer with 10 nodes after the decoder to extract 10 efficient features for regression analysis in the second layer of the Stacking ensemble learner; the Residual Compiler (residual neural network) is a deep learning model framework based on autoencoder and the unique residual block in residual convolutional neural network (ResNet). These frameworks are two outstanding model ideas practiced in the MLP construction;

5. manually specifying 100 decision trees for the Random Forest; by using a grid search method, determining the parameters of the other five machine learning models; and denoting the deep learning model as "DL";

B) Statistical Relationship Between the Input Features and Surface Ozone 1. preparing satellite products with long temporal and spatial range, comprising surface ultraviolet and ozone column satellite products; the target variables to be obtained from the satellite products comprise surface ultraviolet irradiance at the wavelength of 380 nm (denoted as UV), ozone column (denoted as CO3), temporal information (denoted as YY/MM/DD), spatial information (latitude denoted as LAT, longitude demoted as LON) and elevation (denoted as EL); by accessing the OMI sensor onboard Aura satellite, producing a surface ultraviolet irradiance product OMUVBd that is observed by OMI sensor and consists of ultraviolet irradiance at multiple wavelengths (305 nm, 310 nm, 324 nm and 380 nm); selecting the ultraviolet irradiance at 380 nm as the key data because it shows the closest relationship with the ozone photochemical formation; retrieving the column ozone datasets from the OMDOAO3e products, which are the official products with daily observations and global coverage by OMI sensor; and retrieving the elevation from the USGS product.

2. preparing datasets that show on-site surface ozone concentration (denoted as SO3) observed at surface monitoring sites with the same temporal coverage as the satellite products; and matching the station surface ozone concentration to the satellite datasets based on latitude and longitude so as to form a mapping table of surface ozone and other variables; wherein the surface ozone datasets recorded by the stations show various indices; for example, MDA8 represents the daily 8-hour moving average ozone maximum monitored by the site; O3_24 h represents the daily average of surface ozone at all hours; instantaneous records at each hour represent the hourly-level ozone concentration; and these indices are all available as the station surface ozone, while they have to be consistent throughout the processes; and 3. to the deep learning model (DL), the input features comprise YY, MM, DD, LAT, LON, UV, $CO_3$, and EL; and the output feature comprises $SO_3$; and the training the deep learning model (DL) by using the Stacking ensemble learner.

C) Application of the Model to Estimate Surface Ozone 1. by using the retrieval method, estimating the surface ozone for all regions where satellite observations are available while station monitored surface ozone is unavailable; by accessing to the satellite products, obtaining the satellite observations (e.g. surface ultraviolet irradiance and column ozone denoted as UV* and CO3*) in these regions, as well as the corresponding spatial and temporal information (denoted as LAT*, LON* and YY*/MM*/DD*); retrieving the corresponding elevation data from the original data table so as to match to the records by LAT* and LON*; and obtaining a final data table containing all records from regions where satellite observations are available; and 2. inputting the features, comprising UV*, CO3*, EL*, YY*/MM*/DD*, LAT* and LON*, into the already trained deep learning model (DL) to acquire the spatially continuous surface ozone concentration SO3*.

The method to retrieve the spatially continuous surface ozone based on surface ultraviolet irradiance in this disclosure breaks through the limit of accuracy in the conventional retrieval, which considers the column ozone as the main indicator. This method fully makes use of the physical and chemical properties and quantitative relationship between the surface ultraviolet irradiance and photochemical ozone formation. As a result, surface ozone estimations with wide coverage and high accuracy are achieved. Moreover, the trained deep learning model has the advantage of being fast and convenient, which can be applied to fast retrieval. The retrieval results are accurate and thereby feasible to be used in researched in other fields.

BRIEF DESCRIPTION OF THE DRAWINGS

Some more features, purposes, and advantages of the disclosure will become more apparent by reading a detailed description of the following figures as non-restrictive embodiments of the disclosure.

FIG. 1 is the flowchart of procedures in this disclosure;

DETAILED DESCRIPTION OF THE EMBODIMENTS

Figure 2:
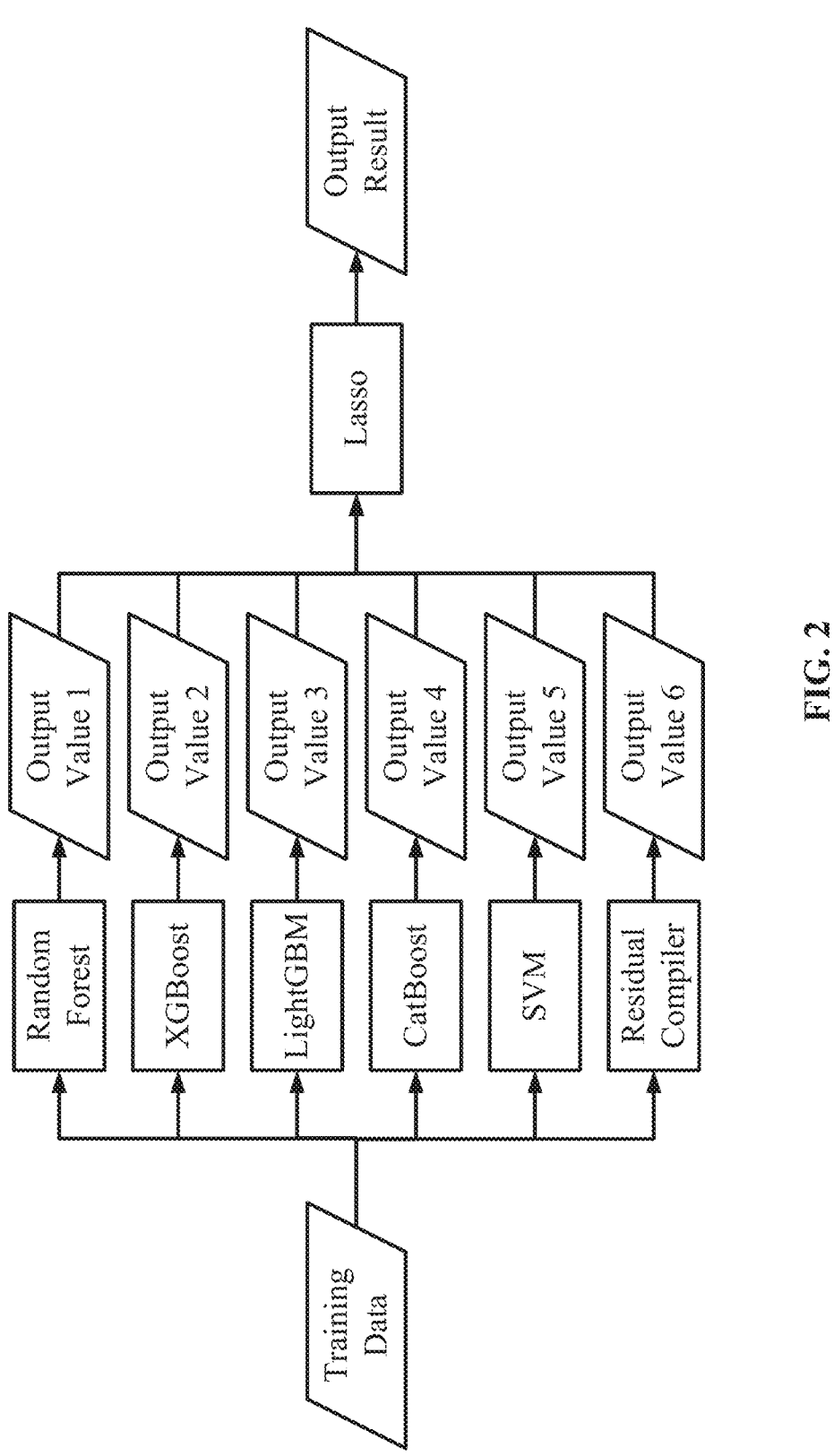
FIG. 2 is the framework of the Stacking ensemble learner in this disclosure.

The embodiments of the disclosure are described in detail as following. The embodiments of the disclosure are implemented on the premise of the technical scheme of the disclosure, and the detailed embodiments and the specific operation process are given. It should be pointed out that a person skilled in the art can make several deformations and improvements without breaking away from the idea of the present disclosure, which belong to the protection scope of the present disclosure.

1. Implementation Goals

The embodiment is provided to clarify the details of retrieval of surface ozone in the spatial range of mainland China and the temporal range of the year of 2018. The result of the satellite-based surface ozone retrieval is compared with the air quality standard. This implementation of retrieval also compares with the conventional retrieval method, which retrieves surface ozone based on ozone column or meteorological condition while suffers from low accuracy for applications. In this embodiment, the retrieval based on surface ultraviolet irradiance is applied to estimate the surface ozone concentration with high accuracy and fast speed. As a result, the embodiment depicts the surface ozone concentration in Wushan County, Chongqing City, where the local sites for monitoring surface ozone in Chongqing City locates ~350 km away from the district. The embodiment reveals that the estimated surface ozone based on this disclosure effectively identifies the spatial heterogeneity of surface ozone distribution.

2. Data Selection

The surface ultraviolet irradiance product OMUVBd from OMI sensor onboard Aura satellite provides information of ultraviolet at the wavelength of 380 nm, which has relationship with ozone photochemical production. In this embodiment, the OMUVBd product with spatial range of latitude ranging 18°-54° and longitude ranging 73°-135° in the year of 2018 are used. Similarly, OMDOAO3e product featuring ozone column from OMI sensor onboard Aura satellite is used in company with the OMUVBd product, which are homogeneous from OMI sensor so that the sampling time can automatically match to avoid any discrepancy. The embodiment focuses on the surface ozone pollution situation in mainland China, thus the in-situ measurements of surface ozone in 2018 are obtained from 1601 monitoring sties operated by China National Environmental Monitoring Center. The daily maximum 8 h average (MDA8) of each monitoring site on each day is calculated based on the Ambient Air Quality Standards GB 3095-2012 promulgated by Ministry of Ecology and Environment of the People's Republic of China. The elevation data is obtained from USGS. The above datasets are the data components of the deep learning model in the surface ozone retrieval. To depict the surface ozone concentration in Wushan County and downtown Chongqing City, the geolocations of these regions are used as following: 106.57° E 29.56° N for downtown Chongqing and 109.68° E 31.09° N for Wushan County.

3. Implementation Process

A) Setup of Deep Learning Model (DL)

Figures 3A, 3B, 3C:
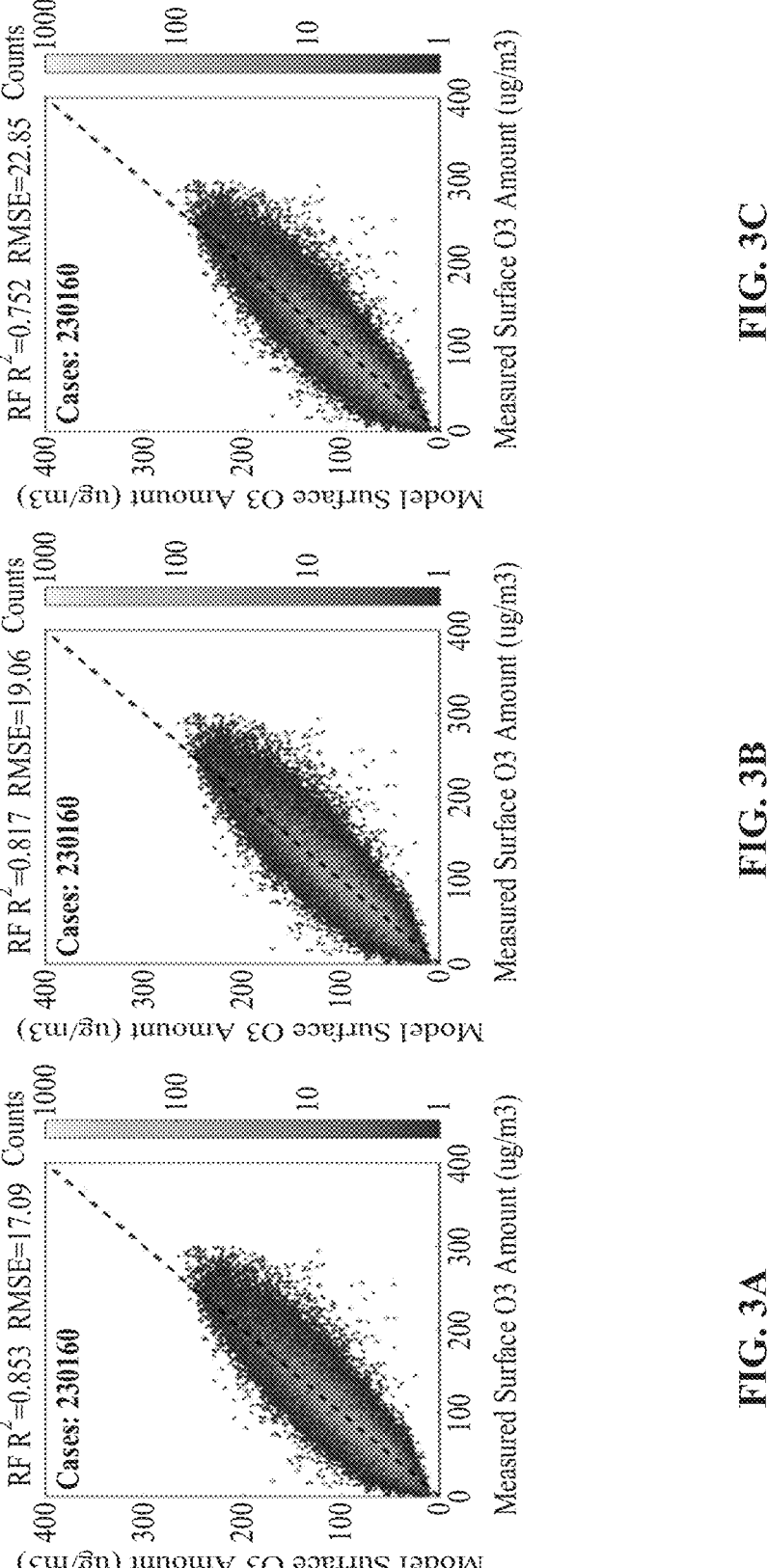
FIGS. 3A-3C are scatterplots of the model retrieved surface ozone versus the site monitored surface ozone. Three cross-validation schemes are presented to evaluate the model performance, comprising FIG. 3A) sample-based cross validation, FIG. 3B) site-based cross-validation and FIG. 3C) time-based cross validation.

1) building a deep learning model with Python 3.8; wherein the deep learning model comprises a plurality of modules such as Tensorflow, Keras, mlxtend, catboost, xgboost, lightgbm and sklearn;

2) constructing a framework of Stacking ensemble learner; applying six modules in the first layer of the Stacking ensemble learner, comprising Random Forest, XGBoost, LightGBM, CatBoost, SVM and Residual Compiler; and applying Lasso as a generalized linear regression model in the second layer of the Stacking ensemble learner; and the Residual Compiler is constructed by the accuracy of the retrieval of surface ozone as shown in FIGS. 3A-3C; and 3) manually specifying 100 decision trees for the Random Forest; by using a grid search method, determining the parameters of the other five machine learning models; and denoting the deep learning model as "DL".

B) Statistical Relationship Between the Input Features and Surface Ozone 1) collecting the data of the satellite products OMUVBd, OMDOAO3e and USGS-SRTM that is monitored in the year of 2018 with spatial coverage of mainland China;

2) integrating the satellite observations (UV and CO3) to form a data table according to the spatial and temporal information of the satellite product; matching the available station surface ozone concentration to elevation and filling into the data table by its spatial and temporal information; and forming the final data table with spatial resolution of 0.25° and temporal resolution of daily level; and 3) to the deep learning model (DL), the input features comprise YY, MM, DD, LAT, LON, UV, $CO_3$, and EL; and the output feature comprises $SO_3$; and the training the deep learning model (DL) by using the Stacking ensemble learner.

C) Application of the Model to Estimate Surface Ozone 1) inputting the features, comprising UV*, CO3*, EL*, YY*/MM*/DD*, LAT* and LON*, into the already trained deep learning model (DL); and the input features are extracted from the data table where the satellite observations are available while the monitored surface ozone SO3 is unavailable;

2) running the trained deep learning model (DL) on the input dataset and outputting the spatially continuous surface ozone concentration SO3*.

D) Estimating the Surface Ozone Concentration in Wushan District, Chongqing City in the Year of 2018

1) applying the geolocation information of Wushan County, Chongqing City and finding the corresponding meteorological, satellite and auxiliary variables of the specific geolocation;

2) obtaining the surface ozone estimation in the year of 2018 by inputting the variables in Wushan County into the trained deep learning model (DL).

4. Method Evaluation

To evaluate the effectiveness and the robustness of this disclosure, cross-validation methods are conducted on the retrieval. In the cross-validation process, the collected records from the data table with available satellite observations and monitored surface ozone are randomly split into 10 groups. In each run of validation, one group is selected as the testing set for the DL model while the other groups are the training set of the DL model. The runs are repeated for 10 times until all groups are selected as the testing set for once. The accuracy of the retrieval of surface ozone is shown in FIGS. 3A-3C. FIG. 3A presents that the surface ozone retrieval can achieve the model accuracy of $R^2$ of 0.85 and RMSE of 17 $\mu g/m^3$ by sample-based cross validation. The results indicate that the retrieval can achieve high accuracy of spatially continuous surface ozone estimations. The validation accuracies are high in all three validation schemes, demonstrating that the spatial and temporal generalization ability is high for this retrieval.

Figure 4:
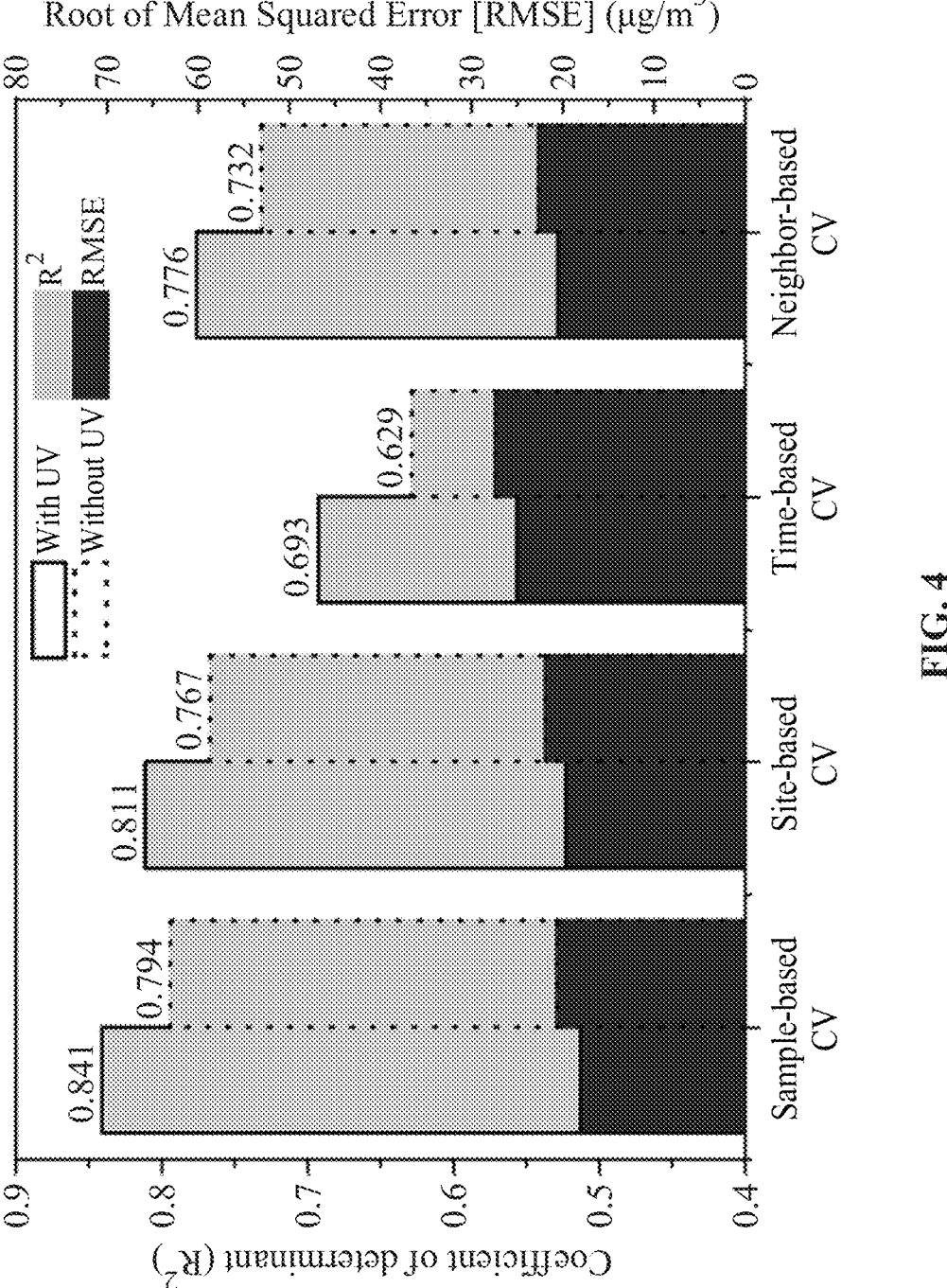
FIG. 4 is the effect of surface ultraviolet irradiance on the model performance under different validation schemes.

The importance of surface ultraviolet irradiance to the surface ozone retrieval is clarified by comparing with the retrieval without this feature. The comparisons are conducted by three validation schemes as well, comprising the sample-based cross-validation, the site-based cross-validation and the neighbor-based cross-validation. FIG. 4 depicted that larger difference can be observed between the retrieval with and without the surface ultraviolet irradiance under all validation schemes. In the sample-based cross-validation, this disclosure achieves accuracy of $R^2$=0.841, while the conventional retrieval has the accuracy of $R^2$=0.794. From the site-based cross-validation, the $R^2$ can reach 0.811, which is much higher than the conventional retrieval where $R^2$ is 0.767. By the time-based cross-validation, this disclosure has much better model performance ($R^2$ of 0.693) compared with conventional model ($R^2$ of 0.629). The neighbor-based cross-validation demonstrates the similar result, where this disclosure has the accuracy of 0.776 while the conventional model has the accuracy of 0.732. The consistency of these validation methods highlight the robustness of the model with the aid of surface ultraviolet irradiance. If the retrieval method is not adapted for retrieving surface ozone concentrations, the estimation errors would be too large to be accurate for applications.

Figure 5:
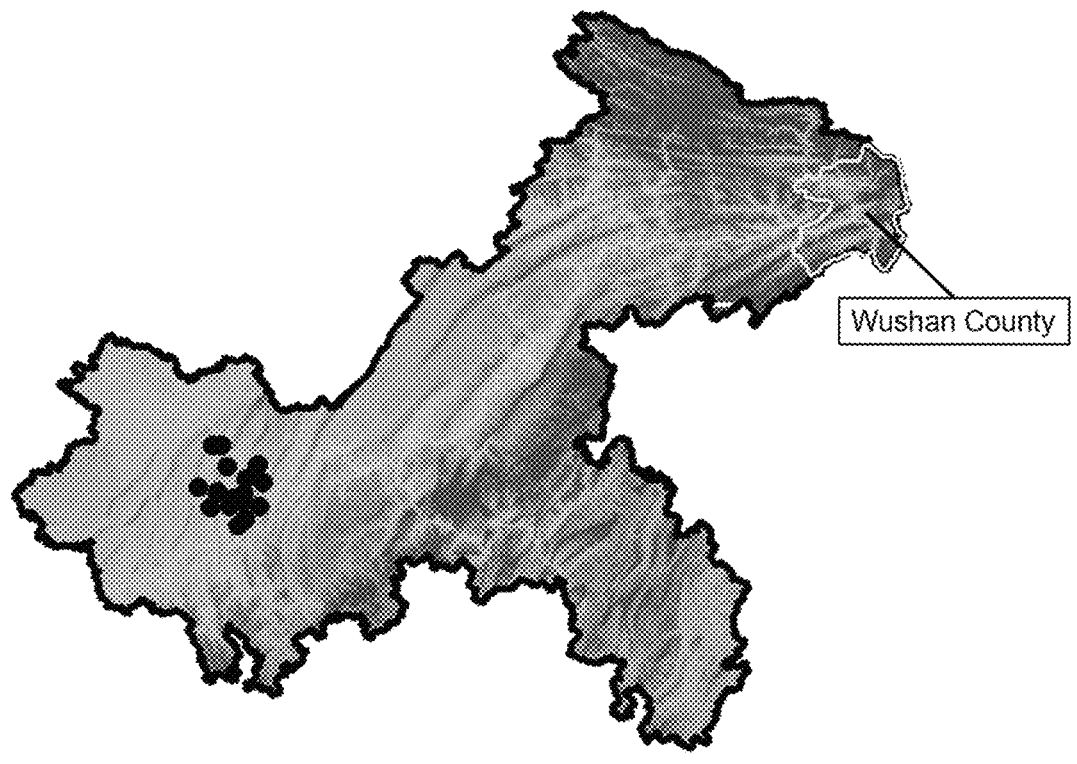
FIG. 5 is the distribution of air pollutant monitoring sites in Chongqing City
Figure 6:
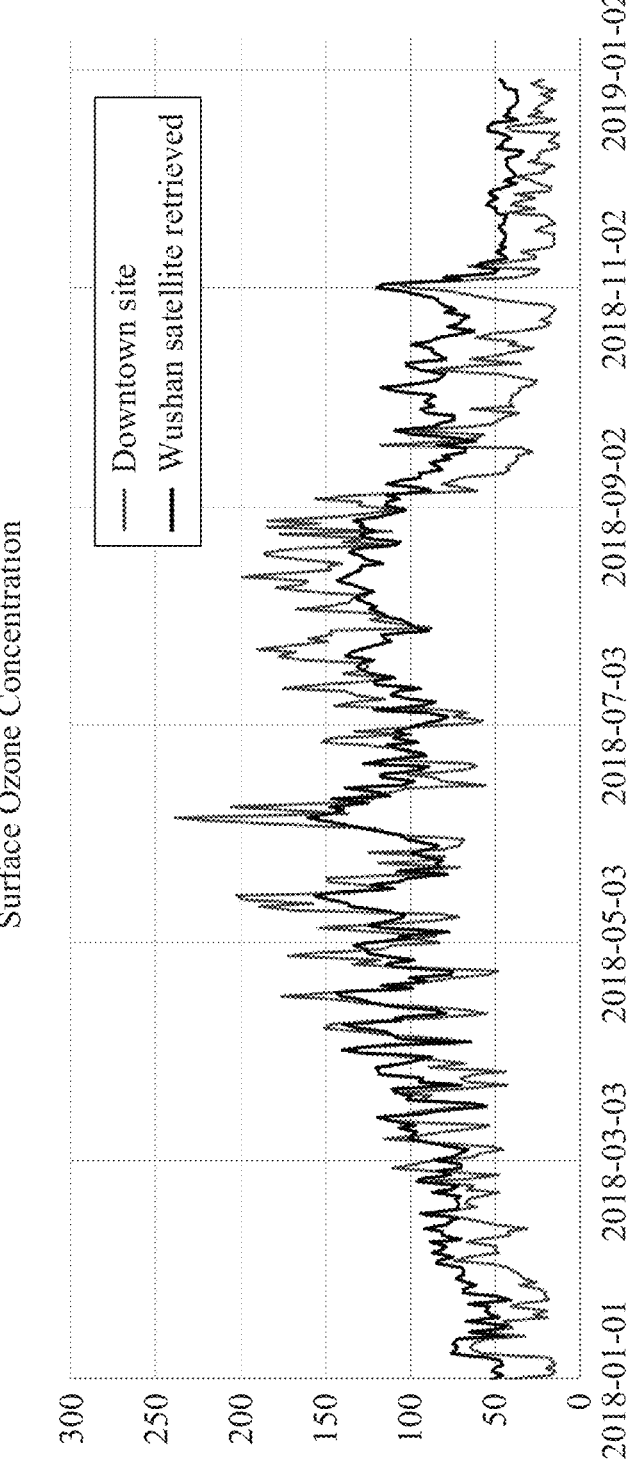
FIG. 6 is the satellite retrieved ozone concentration in Wushan County, Chongqing City versus the site-monitored ozone concentration in the downtown of Chongqing City.
Figure 7:
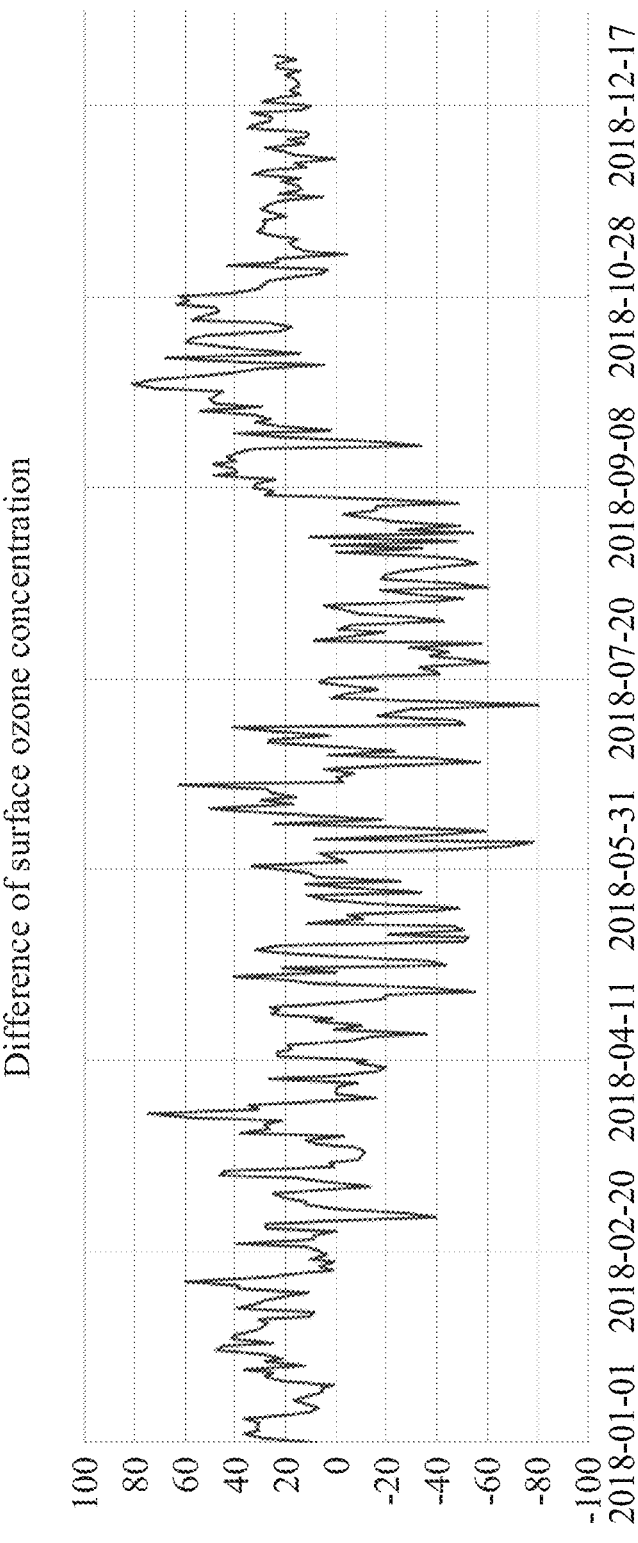
FIG. 7 is difference of surface ozone concentration between the satellite-retrieved method in Wushan County and the data obtained from the downtown Chongqing city.

The embodiment targets to estimate the surface ozone concentration in Wushan County, Chongqing City, wherein the monitoring sites in the downtown Chongqing City locate ~350 km away. FIG. 5 depicted the distribution of monitoring sites for surface ozone in Chongqing City, and the spatial range of Wushan County is marked. FIG. 6 revealed the surface ozone concentration under this disclosure versus the results from the surface monitoring sites in downtown Chongqing City. Apparent fluctuation can be observed between results from both methods, while little consistence can be detected mainly due to the diversity of meteorological and chemical regimes between downtown area and suburb. FIG. 7 depicted the year-round difference between the surface ozone concentration from this disclosure and downtown monitoring sites. The distinction ranges enormously from −80 $\mu g/m^3$ to 80 $\mu g/m^3$, demonstrating great risk of utilizing data from downtown site when evaluating air pollution remote suburb. The estimation of surface ozone can be well applied to evaluation of the air quality. According to the air quality standard, surface ozone concentration exceeding 160 $\mu g/m^3$ can be regarded as indicator of heavily polluted air. With the model, the number of heavily polluted days in Wushan County sum up to 1 in the year of 2018, as indicated in FIG. 6. In summary, this embodiment presents the estimation of surface ozone concentration in Wushan County, Chongqing city where near monitoring sites are inaccessible. Further, this embodiment suggests that it would be more appropriate to utilize the method in this disclosure to evaluate the surface ozone pollution in remote suburb.

The specific embodiments described herein are merely illustrative of the spirit of the disclosure. Those skilled in this field to which this disclosure pertains can make various modifications or additions to the described specific embodiments or substitute in similar manners, but will not deviate from the spirit of the present disclosure or go beyond the definition of the appended claims.

What is claimed is:

1. A retrieval method for surface ozone based on surface ultraviolet radiation irradiance, the method comprising:

A) establishing a deep learning model, wherein the deep learning model is designed to be a two-layered stacking ensemble learning model; a first layer of the deep learning model comprises multiple fundamental machine learning and neural network models, wherein the multiple fundamental machine learning models comprise Residual Compiler, wherein a configuration of the Residual Compiler as one of the multiple fundamental machine learning models in the deep learning model is as follows: an encoder part comprises four hidden layers, and the number of nodes in each layer is (256, 128, 64, 32); a transition layer comprises two hidden layers, and a number of nodes in each layer is (16, 16); and a decoder part comprises four hidden layers, and a number of nodes in each layer is (32, 64, 128, 256), wherein the output of each hidden layer in the encoder part is added to a corresponding hidden layer in the decoder part to form a residual block; and a fully connected layer with 10 nodes is added after the decoder to extract features for regression analysis in the second layer of the deep learning model; a second layer of the deep learning uses Lasso model, which integrates an output from the first layer to obtain a final retrieval result;

B) establishing a statistical relationship between input variables comprising surface UV irradiance, column ozone, elevation of a geolocation, year/month/date, latitude and longitude, and surface ozone concentrations at monitoring sites; matching a site-monitored surface ozone concentration with the surface UV irradiance and column ozone; training the deep learning model;

C) estimating surface ozone concentrations in regions with available satellite observations based on the trained deep learning model; and D) inputting the surface UV irradiance, the column ozone, the elevation of a geolocation, the year/month/date, the latitude and the longitude into the trained deep learning model to estimate surface ozone concentration; evaluating an air quality based on the surface ozone concentration of the geolocation.

2. The method of claim 1, wherein the multiple fundamental machine learning models in A) comprise at least a Random Forest model.

3. The method of claim 1, wherein the multiple fundamental machine learning models further comprise Random Forest, XGBoost, LightGBM, CatBoost, and SVM.

4. The method of claim 1, wherein step B) comprises:

B1) preparing satellite products with temporal range of 1 year and spatial range covering more than 700 km×700 km, with these satellite products comprising surface ultraviolet irradiance and ozone column; recording the surface ultraviolet radiation irradiance at specific wavelengths, ozone column, latitude and longitude in a data table, wherein: the surface ultraviolet radiation irradiance at 380 nm denoted as UV; ozone column denoted as CO3; the date denoted as YY/MM/DD, with YY as the year, MM as the month and DD as the day; latitude denoted as LAT; longitude denoted as LON;

B2) preparing a site-monitored surface ozone concentration from surface monitoring sites and the elevation of the geolocation are prepared with the same time range as the satellite products, wherein: surface ozone concentration denoted as SO3; elevation of the geolocation denoted as EL; matching the site-monitored surface ozone concentration and elevation of the geological location to the satellite-based datasets in the data table in B1 by latitude and longitude; and B3) selecting the records from the data table in B1 where site-monitored surface ozone concentration is available; constructing the deep learning model (DL) with input feature of YY, MM, DD, LAT, LON, UV, CO3, EL and output feature of SO3 for the selected records; and training and saving the deep learning model.

5. The method of claim 1, wherein step C) comprises:

C1) obtaining the surface ultraviolet irradiance and column ozone from satellite products, denoted as UV* and CO3*; obtaining corresponding spatial and temporal information for satellite overpass regions as well, denoted as LAT*, LON* and YY*/MM*/DD*; retrieving the elevation of the geolocation and matching to records by LAT* and LON*; obtaining the elevation of the geolocation denoted as EL*; checking final data table as a result of matching which contains all records from regions where satellite observations are available; and C2) acquiring a spatially continuous surface ozone concentration SO3* by inputting the features comprising UV*, CO3*, EL*, YY*/MM*/DD*, LAT* and LON* into the already trained deep learning model DL.

6. The method of claim 1, wherein step D) comprises:

D1) finding corresponding of the surface UV irradiance, the column ozone, the elevation of a geolocation, the year/month/date, the latitude and the longitude of a specific geolocation; and D2) obtaining surface ozone estimation by inputting variables as listed in D1 into the trained deep learning model (DL); evaluating the air quality based on the estimated surface ozone concentration.

* * * * *